United States Patent [19]

Cooke et al.

[11] Patent Number: 4,958,714
[45] Date of Patent: Sep. 25, 1990

[54] ADJUSTING DEVICE FOR A TWIN-PLATE CLUTCH

[75] Inventors: Richard D. Cooke, Warwick; Charles Higginbottom, Leamington Spa, both of United Kingdom

[73] Assignee: Automotive Products plc, England

[21] Appl. No.: 358,336

[22] PCT Filed: Nov. 11, 1987

[86] PCT No.: PCT/GB87/00802

§ 371 Date: May 8, 1989

§ 102(e) Date: May 8, 1989

[87] PCT Pub. No.: WO88/03613

PCT Pub. Date: May 19, 1988

[30] Foreign Application Priority Data

Nov. 12, 1986 [GB] United Kingdom ............ 8627045
Mar. 20, 1987 [GB] United Kingdom ............ 8706626
Sep. 9, 1987 [GB] United Kingdom ............ 8721156

[51] Int. Cl.$^5$ .................................. F16D 13/75
[52] U.S. Cl. ........................ 192/111 A; 192/70.25
[58] Field of Search ................... 192/70.25, 111 A

[56] References Cited

U.S. PATENT DOCUMENTS

| 2,354,829 | 8/1944 | Reed | 192/70.21 |
| 2,385,517 | 9/1945 | Hunt | 192/70.21 |
| 3,394,787 | 7/1968 | Fitzgerald | 192/111 A |
| 3,797,622 | 3/1974 | Worner et al. | 192/111 A |
| 3,871,500 | 3/1975 | Linn et al. | 192/111 A |
| 4,742,901 | 5/1988 | Takeuchi et al. | 192/111 A |
| 4,787,493 | 11/1988 | Ohsono et al. | 192/111 A |

FOREIGN PATENT DOCUMENTS

| 1019201 | 1/1953 | France | 192/111 A |
| 2335737 | 7/1977 | France | |
| 19-3124 | 2/1944 | Japan | 192/111 A |
| 966888 | 8/1964 | United Kingdom | |
| 1019169 | 2/1966 | United Kingdom | |
| 1053413 | 1/1967 | United Kingdom | |
| 1179670 | 1/1970 | United Kingdom | |
| 2125910 | 8/1985 | United Kingdom | |

Primary Examiner—Rodney H. Bonck
Attorney, Agent, or Firm—Davis, Bujold & Streck

[57] ABSTRACT

An automatic adjusting device for a twin-plate clutch includes a pin (139) which is mounted in a bore (137) formed in an intermediate pressure plate (135) of the clutch so as to be slidable along an axis parallel to the axis of rotation of the clutch. First and second abutments are provided adjacent to the pin, the first abutment providing a stop for determining adjustment of the pin relative to the intermediate pressure plate and the second abutment providing a stop for determining an intermediate position of the intermediate pressure plate. A plate (144) is mounted on the pin by way of an aperture provided in the plate, the aperture being dimensioned such that the plate is tiltable relative to the pin. A third abutment (145) is provided on the intermediate pressure plate and is engageable with the tiltable plate, the third abutment defining an axis about which the plate is tiltable. A resilient member in the form of a coil spring (150) urges the tiltable plate in the axial direction of the clutch and towards the third abutment so as to cause the plate to tilt and to engage the pin. This permits adjustment of the pin relative to the intermediate pressure plate when the pin is urged against the first abutment and inhibits movement of the pin relative to the intermediate pressure plate when the pin is urged against the second abutment.

13 Claims, 7 Drawing Sheets

ADJUSTING DEVICE FOR A TWIN-PLATE CLUTCH

The present invention relates to an automatic adjusting device for a twin plate clutch, the adjusting device operating automatically to compensate for wear of the friction elements of the clutch.

Automatic adjusting devices are known, for example from British Patent Specification No. 1 053 413 in which a friction-held pin is mounted in an intermediate pressure plate of the clutch and is caused to slide relative to the intermediate pressure plate should there be any movement of the intermediate pressure plate resulting from wear in the friction elements of the clutch so as to re-position the intermediate pressure plate. However, we have found that vibration can cause the friction-held pin to move even if there is no wear in the friction elements and this can result in premature partial engagement of the clutch. An alternative automatic adjusting device is known from British Patent Specification No. 1 456 149 in which a friction-held sleeve is mounted in an intermediate pressure plate of the clutch and is caused to slide relative to the intermediate pressure plate so as to re-position the pressure plates should there be any movement between the intermediate pressure plate and the main pressure plate resulting from wear in the friction elements of the clutch. Once again, we have found that vibration can cause the friction-held sleeve to move even if there is no wear in the friction elements resulting in premature partial engagement of the clutch.

It is an object of the present invention to provide an automatic adjusting device for a twin-plate clutch which does not permit undesired movement of the adjusting pin.

According to the present invention there is provided an automatic adjusting device for a twin-plate clutch comprising:

a pin mounted on an intermediate pressure plate of the clutch so as to be slidable along an axis parallel to the axis of rotation of the clutch;

first and second abutments provided adjacent to the pin, the first abutment providing a stop for determining adjustment of the pin relative to the intermediate pressure plate and the second abutment providing a stop for determining an intermediate position of the intermediate pressure plate;

a plate mounted on the pin by way of an aperture provided in the plate, which aperture is dimensioned such that the plate is tiltable relative to the pin;

a third abutment provided on the intermediate pressure plate and engageable with the tiltable plate, the third abutment defining an axis about which the plate is tiltable; and a resilient member urging the tiltable plate in the axial direction of the clutch towards the third abutment so as to cause the plate to tilt and to engage the pin, permitting adjustment of the pin relative to the intermediate pressure plate when the pin is urged against the first abutment and inhibiting movement of the pin relative to the intermediate pressure plate when the pin is urged against the second abutment.

The first abutment may be provided on a main pressure plate of the clutch and engageable by a circlip located in a circumferential groove formed in the pin and extending radially outwardly from said groove.

Alternatively, the first abutment may be provided on a face of a driving member of the clutch and may be engageable by an end of the pin.

The second abutment may be provided on a main pressure plate of the clutch and engageable by an enlarged head portion provided at an end of the pin or by a circlip mounted on the pin.

The second abutment may alternatively be provided on a spacing ring arranged between a driving member of a clutch and a clutch cover and may be engageable by an end of the pin.

The resilient member may be a coil spring which is arranged around the pin.

Alternatively, the resilient member may be a coil spring located on that side of the pin remote from the third abutment. The coil spring may be held in place by a pin or rivet extending axially within the spring.

A further resilient member may be provided to urge the pin towards the first abutment.

Frictional damping means may be positioned around the pin so as to increase the frictional force between the pin and the intermediate pressure plate.

As a further alternative, the resilient member may comprise a leaf spring.

The pin may be provided with radially opposed substantially flat surfaces which engage with corresponding substantially straight edges defining a part of the aperture in the plate. The flat surfaces provided on the pin may be formed with serrations.

For a better understanding of the present invention and to show more clearly how it may be carried into effect reference will now be made, by way of example, to the accompanying drawings in which.

The drawings show only part of a twin-plate clutch, but a more general description of such a clutch is given in British Patent Specifications Nos. 1 456 149 and 1 053 413 mentioned above.

Figure 1:
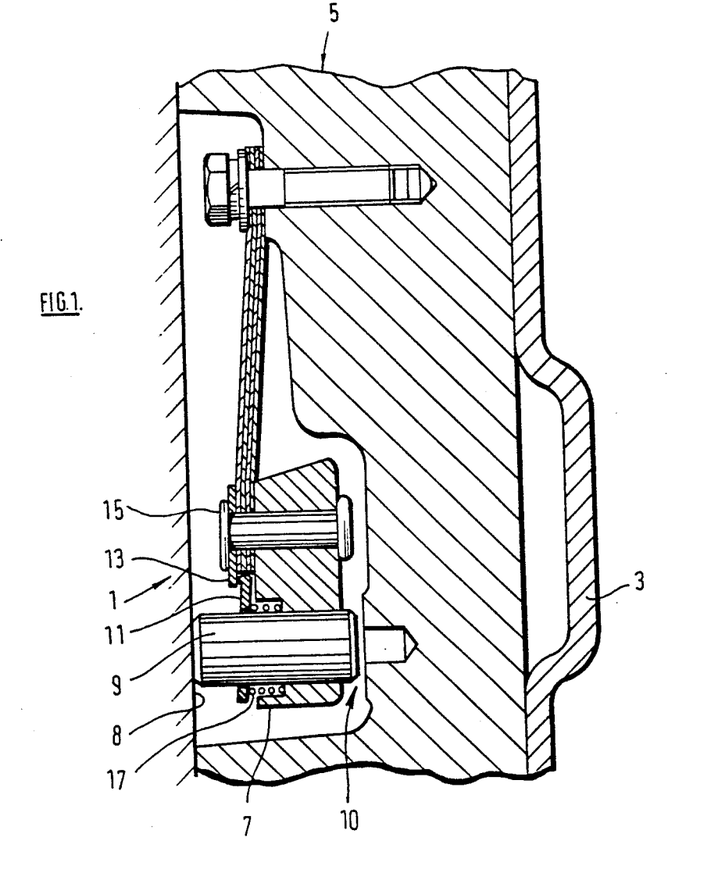
FIG. 1 is a sectional view through part of a twin-plate clutch incorporating one embodiment of an automatic adjusting device according to the present invention.

FIG. 1 shows a clutch driving member 1, such as the flywheel of an internal combustion engine, which member 1 is secured to a clutch cover 3 by way of a spacing ring 5 which surrounds the periphery of an intermediate pressure plate 7. Slidably mounted in a hole formed through the intermediate pressure plate is a pin 9 which is dimensioned to slide easily along an axis parallel to the axis of rotation of the clutch. One end of the pin 9 is adjacent to a first abutment 8 in the form of the face of the driving member 1 and the other end of the pin 9 is adjacent to a second abutment 10 formed on the spacing ring 5.

A circlip (not shown) can be positioned around the pin 9 in order to increase the resistance to movement of the pin if this is considered desirable. The circlip can be positioned at the bottom of an annular recess formed between the pin 9 and a part of the intermediate pressure plate 7. Loosely fitted over the pin 9 is a tiltable plate 11, the plate having an aperture which is larger than the cross-section of the pin 9 so as to enable the plate 11 to tilt relative to the pin. The plate 11 should preferably be made of a material which is harder than that of the pin 9, for example the pin 9 may be made of mild steel which may or may not be case hardened, whereas the plate 11 may be made of spring steel or hardened mild steel. This ensures that the edges of the aperture of the plate 11 are not deformed and permit the plate to grip firmly against the pin when required as will be described in more detail hereinafter. The plate 11 is formed with a lip at one end, which lip engages under a third abutment in the form of a fulcrum plate 13 which is held in place by a rivet 15. The lip formed on the plate 11 and the fulcrum plate 13 co-operate to define an axis about which the plate 11 is tiltable.

A resilient member in the form of a coil spring 17 is positioned around the pin 9 within the annular recess between the pin and the intermediate pressure plate. The coil spring 17 urges the plate 11 towards the fulcrum plate 13 and so causes the plate 11 to tilt and to engage the pin as shown in FIG. 1. Spring 17 may be formed so that it exerts a relatively greater force against that portion of the plate 11 which is remote from the fulcrum plate 13.

In use, when the clutch is assembled, initial adjustment of the pin 9 can readily be accomplished by urging that part of the pin 9 remote from the fulcrum plate 13 in a direction away from the clutch driving plate 1. This releases the engagement between the pin 9 and the plate 11 and allows the pin 9 to take up the desired initial position.

As the friction elements (not shown) of the clutch wear it is desirable that the intermediate pressure plate 7 should approach more closely the driving plate 1 while at the same time being restrained as to the distance by which the driving plate 1 and the intermediate pressure plate 7 can be separated. When the clutch is disengaged, separation between the driving plate and the intermediate pressure plate is limited by engagement of one end of the pin 9 with the second abutment 10 formed on the spacing ring 5. However, when the clutch is engaged, the pin 9 is urged towards the first abutment 8 which is formed by a face of the driving plate 1. If adjustment is required, the urging of the pin 9 against the driving plate 1 causes the tiltable plate to change its inclination which permits the pin 9 to slide relative to the intermediate pressure plate thus reducing the distance between the intermediate pressure plate and the driving member. When the adjustment has been accomplished the coil spring 17 urges the tiltable plate 11 back into its tilted position thus establishing the adjusted configuration.

Figure 2:
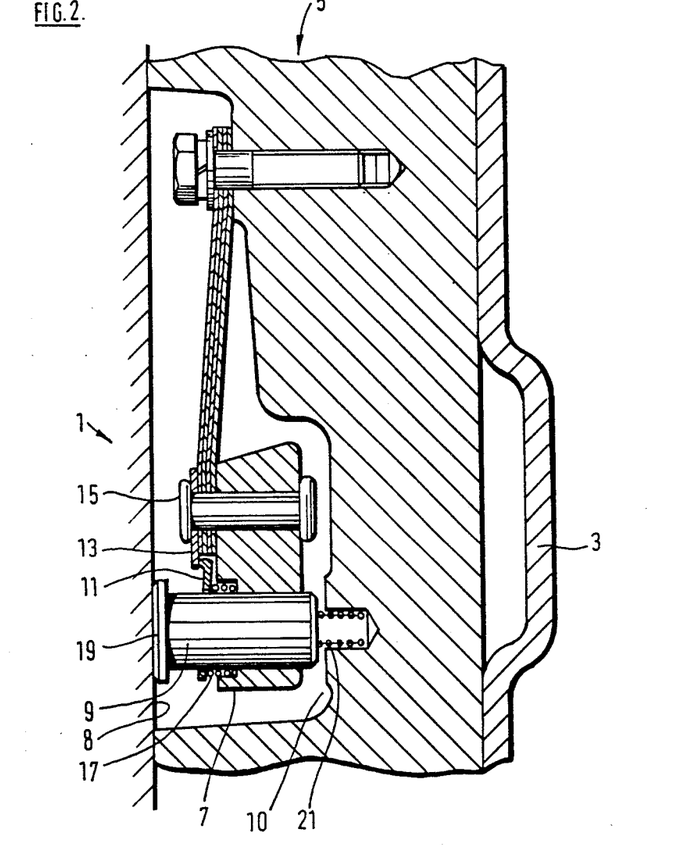
FIG. 2 is a sectional view through part of a twin-plate clutch incorporating a second embodiment of an automatic adjusting device according the present invention.

The embodiment of the automatic adjusting device shown in FIG. 2 is similar to that shown in FIG. 1 and the same reference numerals are used to denote the same or corresponding elements. However, in the embodiment shown in FIG. 2 the pin 9 is formed with an enlarged head 19 adjacent to the driving member 1. The enlarged head 19 more readily accommodates the small amount of radial movement which occurs when the clutch is operated. In addition, a coil spring 21 is arranged in a recess formed in the second abutment 10 formed on the spacing ring 5. The coil spring 21 urges the pin 9 towards the driving member 1 and automatically adjusts the pin 9 in a direction towards the driving member 1 after assembly of the clutch.

Figure 3:
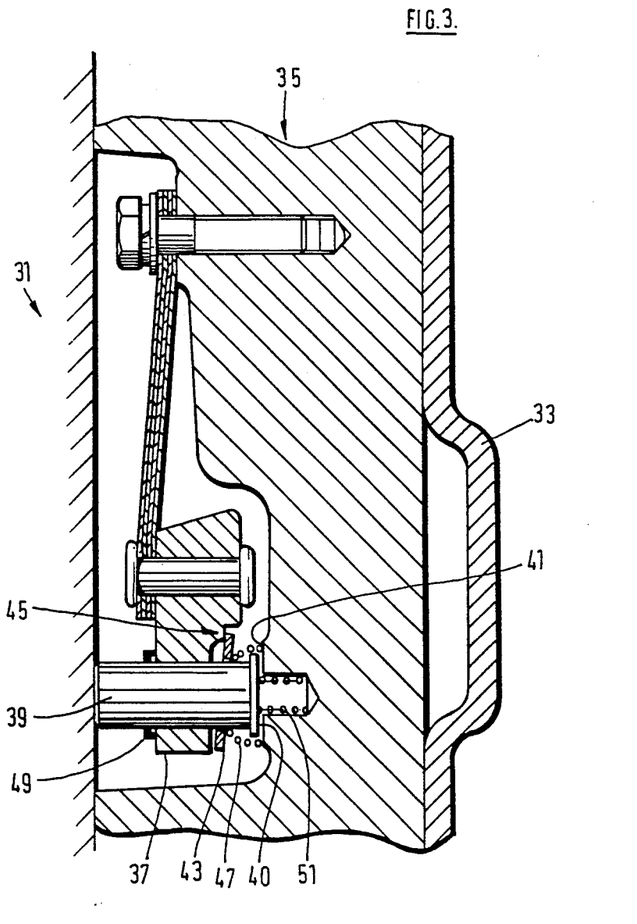
FIG. 3 is a sectional view through part of a twin-plate clutch incorporating a third embodiment of an automatic adjusting device according to the present invention.

The embodiment of the automatic adjusting device shown in FIG. 3 differs from the embodiments shown in FIGS. 1 and 2 in that the tilting plate is located on that side of the intermediate pressure plate remote from the driving plate. In the embodiment shown in FIG. 3, a clutch driving member 31 is secured to a clutch cover 33 by way of a spacing ring 35 which surrounds the periphery of an intermediate pressure plate 37. A pin 39 is slidably mounted in a hole formed through the intermediate pressure plate and is slidable along an axis parallel to the axis of rotation of the clutch. One end of the pin 39 is adjacent to a first abutment 38 in the form of the face of the driving member 31 and the other end of the pin 39 is formed with a head 40 which is adjacent to a second abutment 41 formed on the spacing ring 35. Loosely fitted over the pin 39 is a tiltable plate 43 which may be in the form of a round washer. One edge of the tiltable plate 43 engages with a lip 45 formed on the intermediate pressure plate which together with the tiltable plate 43 defines an axis about which the plate is tiltable.

A coil spring 47 extends between the second abutment 41 and the tiltable plate 43 so as to urge the plate 43 towards the driving member 31 and to cause the plate to tilt and to engage the pin 39. The spring 47 may be partly conical so as to locate positively on the spring to facilitate assembly of the adjusting device. A friction washer assembly 49, such as a plastics washer, may be used to hold the adjusting device in position in the intermediate pressure plate during assembly of the clutch. A coil spring 51 is arranged in a recess formed in the second abutment 41 on the spacing ring 35 and urges the pin 39 towards the driving member 31 and automatically adjusts pin 39 in a direction towards the driving member 31 after assembly of the clutch.

In use, the automatic adjusting device shown in FIG. 3 operates on the same principle as the device shown in FIG. 2. However, with the embodiment shown in FIG. 3 it is not necessary to provide a fulcrum plate rivetted to the intermediate pressure plate.

Figure 4:
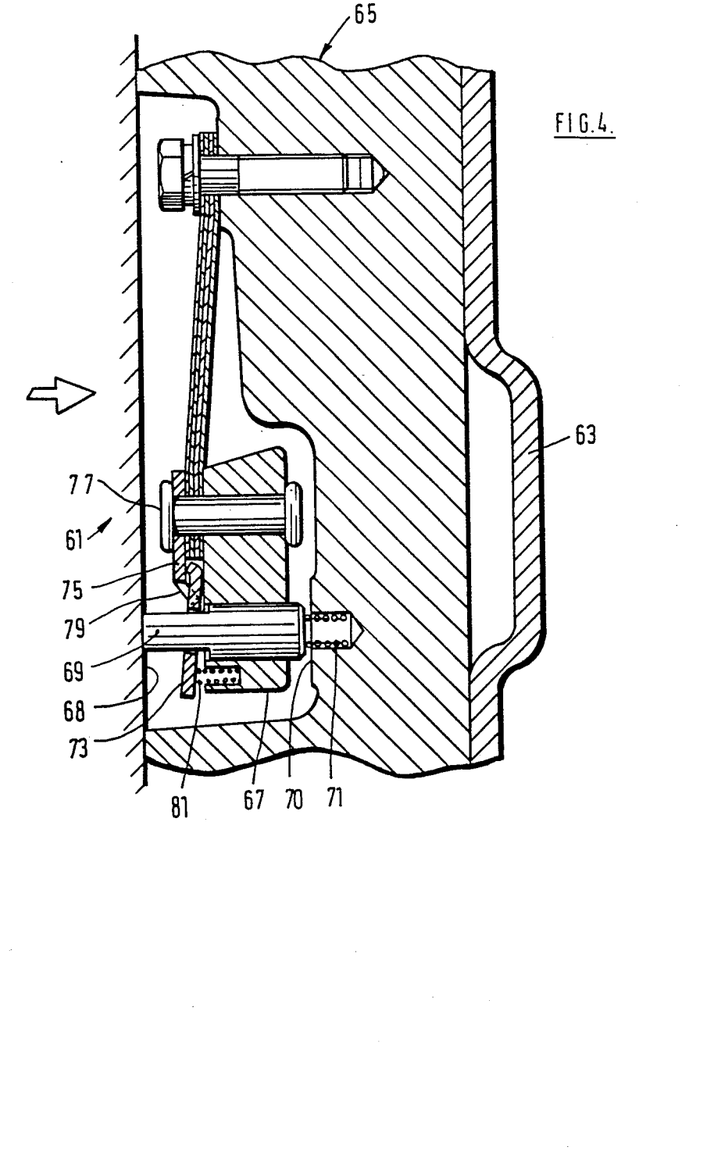
FIG. 4 is a sectional view through part of a twin-plate clutch incorporating a fourth embodiment of an automatic adjusting device according to the present invention.
Figure 5:
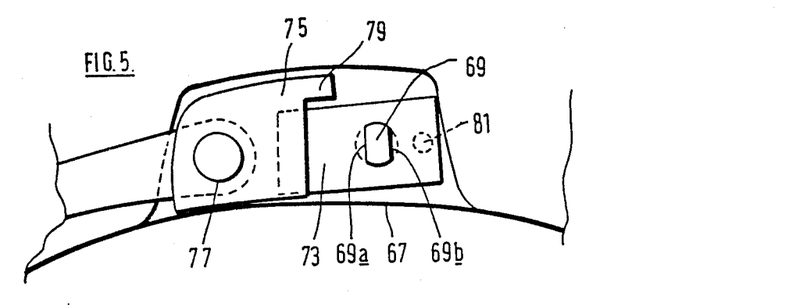
FIG. 5 is an elevational view taken in the direction of the arrow shown in FIG. 4.

FIGS. 4 and 5 show a clutch driving member 61 which is secured to a clutch cover 63 by way of a spacing ring 65 which surrounds the periphery of an intermediate pressure plate 67. Slidably mounted in a hole formed through the intermediate pressure plate is a pin 69 which is dimensioned to slide easily along an axis parallel to the axis of rotation of the clutch. One end of the pin 69 is adjacent to a first abutment 68 in the form of the face of the driving member 61 and the other end of the pin 69 is adjacent to a second abutment 70 formed on the spacing ring 65. The pin 69 is formed with radially opposed flat surfaces 69a,69b which can be formed with serrations. A coil spring 71 is arranged in a recess formed in the second abutment 70 formed on the spacing ring 65. The coil spring 71 urges the pin 69 towards the driving member 61 and automatically adjusts the pin in a direction towards the driving member 61 after assembly of the clutch.

Loosely fitted over the pin 69 is a tiltable plate 73, the aperture in the plate being defined in part by straight edges which correspond to the flat surfaces 69a,69b provided on the pin 69. This gives a line of contact between the plate 73 and the pin 69 when the plate is tilted which can provide better grip than that available from a circular aperture and pin. The serrations on the flat surfaces of the pin can improve grip under vibration conditions. The plate 73 is deformed to provide a lip at one end, which lip engages under a third abutment in the form of a fulcrum plate 75 which is held in place by a rivet 77. The lip formed on the plate 73 and the fulcrum plate 75 co-operate to define an axis about which the plate 73 is tiltable.

The fulcrum plate 75 is provided with a tab 79 which engages with an edge of plate 73 as shown in FIG. 5 to prevent rotation of plate 73 in one direction. Rotation of the plate 73 in the opposite direction is prevented by engagement with a raised portion of the intermediate pressure plate 67.

A resilient member in the form of a coil spring 81 is positioned in a recess formed in the intermediate pressure plate on that side of the pin 69 remote from the fulcrum plate 75. The coil spring 81 urges the plate 73 towards the fulcrum plate and so causes the plate 73 to tilt and to engage the pin as shown in FIG. 4.

In use, the automatic adjusting device shown in FIGS. 4 and 5 operates on the same principle as the device shown in FIG. 2. However, the location of the coil spring 81 on the opposite side of the pin 69 to the fulcrum plate 75 gives the spring greater leverage and also permits the pin 69 to be supported over a greater proportion of its length.

Figure 6:
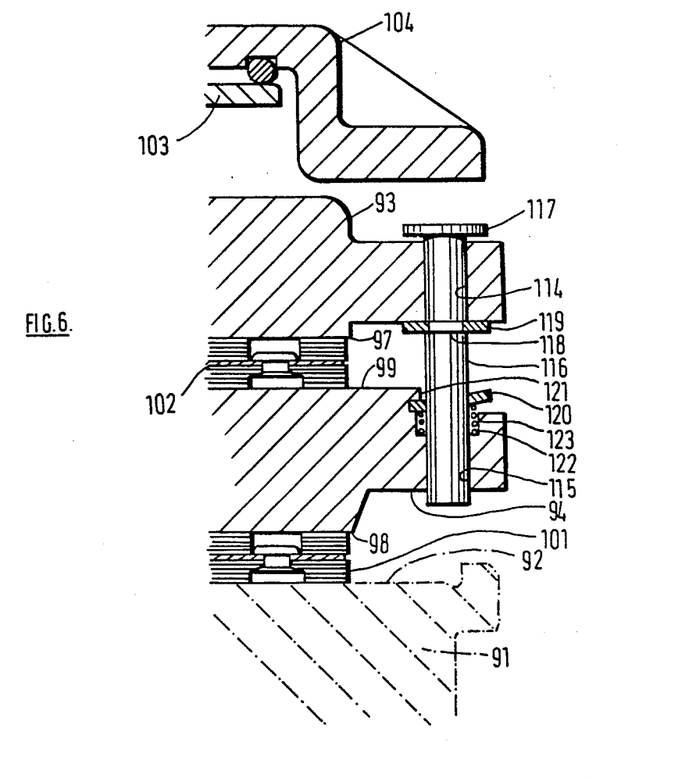
FIG. 6 is a sectional view through part of a twin-plate clutch incorporating a fifth embodiment of an automatic adjusting device according to the present invention.

In the embodiment shown in FIG. 6 a flywheel 91 is attached to the crankshaft of an engine (not shown) and includes a driving surface 92. A main pressure plate 93 is supported for rotation with the flywheel by conventional drive straps (not shown) which allow axial movement of the pressure plate 93 relative to the flywheel 91. An intermediate pressure plate 94 is interposed between the main pressure plate 93 and the flywheel 91 and is also supported for rotation with the flywheel by conventional drive straps (not shown) which allow axial movement of the pressure plate 94 relative to the flywheel 91 and the pressure plate 93. The main pressure plate has a driving surface 97 facing the flywheel 91. The intermediate pressure plate 94 has a first driving surface 98 facing the flywheel 91 and a second driving surface 99 facing the main pressure plate 93. A first driven plate 101 is interposed between the driving surface on the flywheel 91 and the driving surface 98 on the intermediate pressure plate 94. A second driven plate 102 is interposed between the second driving surface 99 on the intermediate pressure plate 94 and the driving surface 97 on the main pressure plate 93. A diaphragm spring 103 acts between a cover plate 104, bolted to an annular spacing ring (not shown) which is also bolted to the flywheel 91, and the main pressure plate 93 to frictionally engage the driven plates 101, 102 with their respective driving surfaces 92 and 98, 99 and 97.

The intermediate pressure plate 94 has a bore 115 the axis of which is parallel to the main axis of the clutch. The main pressure plate 93 has a bore 114 the axis of which is also parallel to the main axis of the clutch and is aligned in the axis of the bore 115. A pin 116 is slidably mounted in the bores 114,115 and is formed with a flattened head portion 117 on that side of the main pressure plate remote from the intermediate pressure plate and which in use bears against a second abutment constituted by a part of the face of the main pressure plate 93. The pin 116 is formed with a circumferential groove 118 on that side of the pin 15 adjacent to the intermediate pressure plate. A circlip 119 is positioned in the groove 118 and, in use, bears against a first abutment constituted by a part of the face of the main pressure plate 93. The distance between adjacent faces of the head portion 117 and the circlip 119 is greater than the thickness of the main pressure plate where the pin extends therethrough so that a lost-motion connection is provided between the pin 116 and the main pressure plate 93.

Loosely fitted over the pin 116 is a tiltable plate 120, the plate having an aperture which is larger than the cross-section of the pin 116 so as to enable the plate 120 to tilt relative to the pin. The plate 120 is mounted beneath a lip 121 provided on the intermediate pressure plate and forming a third abutment. A resilient member in the form of a coil spring 122 is positioned around the pin 116 within an annular recess 123 provided between the pin and the intermediate pressure plate. The coil spring 122 urges the plate 120 towards the lip 121 and so causes the plate to tilt about an axis defined by an edge of the lip and to engage the pin 116. Spring 122 may be formed so that it exerts a relatively greater force against that portion of the plate 120 which is remote from the lip 121. In use, when the clutch is assembled initial adjustment of the pin 116 can readily be accomplished by depressing the tiltable plate 120 towards the intermediate pressure plate 94 to disengage the plate and the pin, urging the pin away from the flywheel 91 and releasing the plate 120.

The driven plates of the clutch are released from engagement with the driving surfaces 92 and 98,99 and 97 by pulling the main pressure plate 93 in a direction away from the flywheel 91. This causes the driving surface 97 of the main pressure plate to disengage from the driven plate 102 and the driven plate 102 thus to disengage from the driving surface 99 of the intermediate pressure plate 94. When the lost motion is taken up between the main pressure plate 93 and the head portion 117 of the pin 116 the intermediate pressure plate 94 is pulled in a direction away from the flywheel 91 by means of the engagement of the tiltable plate 120 with the pin 116 causing the driving surface 98 of the intermediate pressure plate to disengage from the driven plate 101 and the driven plate 101 thus to disengage from the driving surface 92 of the flywheel 91.

As the friction elements of the clutch wear it is desirable that the main pressure plate 93 should approach more closely the intermediate pressure plate 94 while at the same time being restrained as to the distance by which the main pressure plate and the intermediate pressure plate can be separated. When the clutch is engaged, the circlip 119 urges the pin 116 in a direction towards the flywheel 91. If adjustment is required the urging of the pin towards the flywheel 91 causes the tiltable plate 120 to change its inclination which permits the pin 116 to slide relative to the intermediate pressure plate thus reducing the distance between the main pressure plate and the intermediate pressure plate. When the adjustment has been accomplished the coil spring 122 urges the tiltable plate 120 back into its tilted position thus establishing the adjusted configuration.

Figure 7:
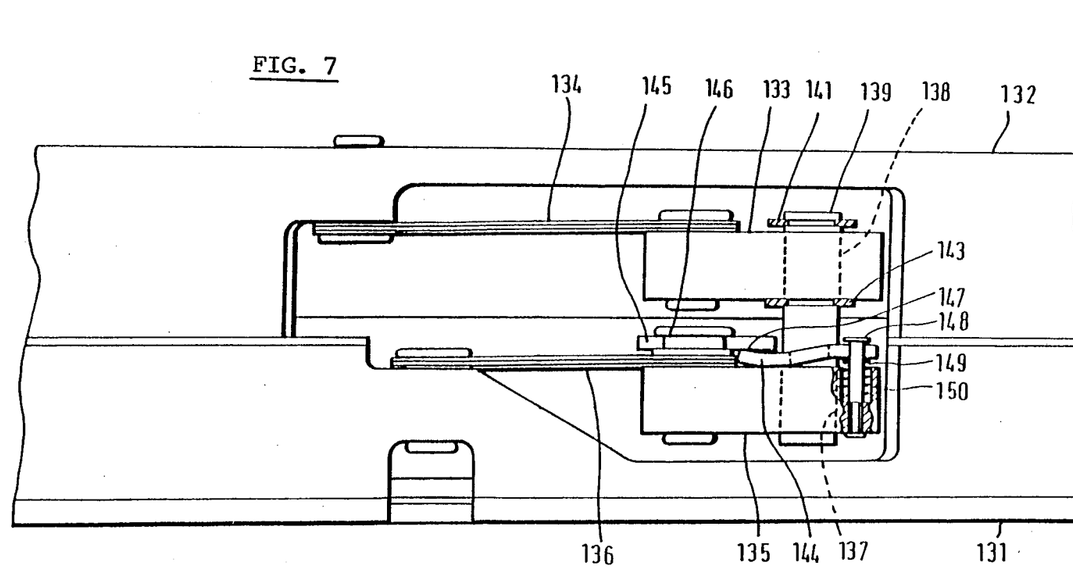
FIG. 7 is a sectional view through part of a twin-plate clutch incorporating a sixth embodiment of an automatic adjusting device according to the present invention.

The embodiment shown in FIG. 7 is a modification of the embodiment shown in FIG. 6. However, because the view is different the embodiment of FIG. 7 will be described in some detail.

A pair of annular spacing rings 131,132 are secured together with the ring 131 being secured to a flywheel (not shown) which is attached to the crankshaft of an engine and the ring 132 being secured to a clutch cover (not shown). A main pressure plate 133 is supported for rotation with the ring 132 by conventional drive straps 134 which allow axial movement of the pressure plate 133 relative to the ring 132. An intermediate pressure plate 135 is interposed between the main pressure plate 133 and the flywheel and is supported for rotation with the ring 131 by conventional drive straps 136 which allow axial movement of the pressure plate 135 relative to the ring 131. A first driven plate is interposed between flywheel and the intermediate pressure plate and a second driven plate is interposed between the intermediate pressure plate and the main pressure plate.

The intermediate pressure plate 135 has a bore 137 the axis of which is parallel to the main axis of the clutch and the main pressure plate 133 has a bore 138 the axis of which is also parallel to the main axis of the clutch and is aligned with the axis of the bore 137. A pin 139 is slidably mounted in the bores 137,138 and is formed with a circumferential groove on that side of the main pressure plate remote from the intermediate pressure plate and which in use bears against a second abutment constituted by a part of the face of the main pressure plate 133 by way of a circlip 141 mounted in the groove. The pin 139 is formed with a further circumferential groove 142 on that side of the pin adjacent to the intermediate pressure plate. A circlip 143 is positioned in the groove and, in use, bears against a first abutment constituted by a part of the face of the main pressure plate 133. The distance between adjacent faces of the circlip 141 and the circlip 143 is greater than the thickness of the main pressure plate so that a lost-motion connection is provided between the pin 139 and the main pressure plate 133.

Loosely fitted over the pin 139 is a tiltable plate 144, the plate having an aperture which is larger than the cross-section of the pin 139 so as to enable the plate to tilt relative to the pin. The plate 144 is mounted beneath a fulcrum plate 145 which is secured to the intermediate pressure plate 135 by a rivet 146 which also secures the drive straps 136. The fulcrum plate 145 forms a third abutment and in combination with a lip 147 provided on the tiltable plate 144 defines an axis about which the plate 144 is tiltable. Correct location of the tiltable plate 144 is maintained by a pin or stepped rivet 148 which extends through a further aperture in the plate 144 and is secured in the intermediate pressure plate 135. An annular recess 149 is formed around a part of the rivet 148 and a resilient member in the form of a coil spring 150 is located in the recess 149 and extends around the rivet 148 such that the rivet extends axially within the spring. The coil spring 150 urges the plate 144 in a direction towards the fulcrum plate 145 and so causes the plate 144 to tilt and to engage the pin 139.

Operation of the automatic adjusting device is effectively the same as for the embodiment described with reference to FIG. 6. However the location of the coil spring 150 on the oppposite side of the pin 139 to the fulcrum plate 145 gives the spring greater leverage and permits the pin 139 to be supported over a greater proportion of its length.

Figures 8, 9, 10:
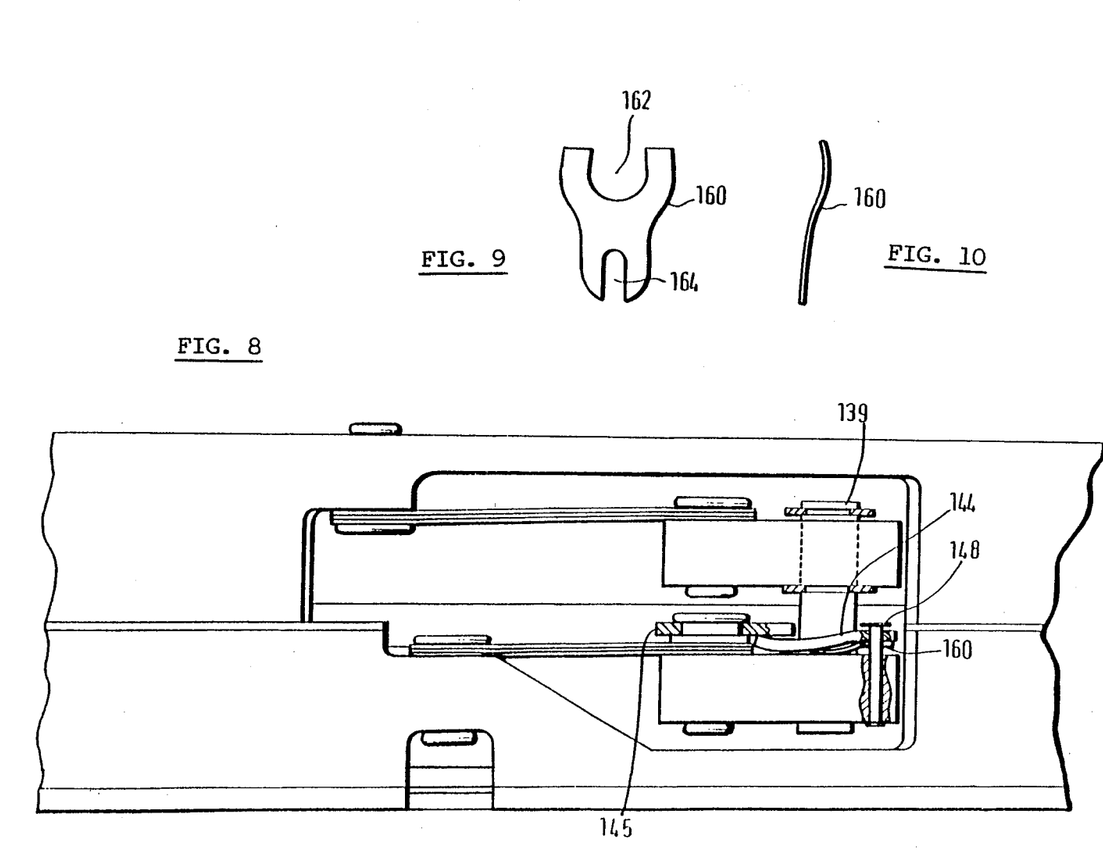
FIG. 8 is a sectional view through part of a twin-plate clutch incorporating a seventh embodiment of an automatic adjusting device according to the present invention.
FIG. 9 is a plan view of a leaf spring forming part of the automatic adjusting device shown in FIG. 8.
FIG. 10 is an elevational view of the leaf spring shown in FIG. 9.

The embodiment shown in FIGS. 8 to 10 is a modification of that shown in FIG. 7 and only the essential differences of the embodiment shown in FIGS. 8 to 10 will be described. The same reference numerals are used in FIG. 8 to denote the same parts as those shown in FIG. 7.

Instead of a resilient member in the form of a coil spring, the resilient member comprises a leaf spring 160. As can be seen from FIG. 9, the leaf spring is formed with a recess 162 which engages with the pin 139 and with a recess 164 which engages with the rivet 148 so as to provide positive location for the leaf spring. As can be seen from FIG. 10, the leaf spring is formed so as to urge the plate 144 in a direction towards the fulcrum plate 145 and so causes the plate 144 to tilt and to engage the pin 139.

Operation of the automatic adjusting device is effectively the same as for the embodiment described with reference to FIG. 7. However, the provision of a leaf spring enables the spring to act on both ends of the tiltable plate 144 and to eliminate any movement of the plate 144 away from the fulcrum plate 145 before adjustment of the plate 144 on the pin 139 takes place.

Although the use of a pin having opposed flat surfaces and an aperture in the tiltable plate being defined in part by straight edges is described herein with specific reference to the embodiment shown in FIGS. 4 and 5, it will be understood that such a modification can be applied to other embodiments of the invention.

We have found that the embodiments of the automatic adjusting device described with reference to the accompanying drawings is robust and easy to manufacture. There is no backlash in the device and it does not detract from the clamp load exerted on the driven plates of the clutch.

We claim:
1. An automatic adjusting device for a twin-plate clutch comprising:
 a pin (9,39,69,116,139) mounted on an intermediate pressure plate (7,37,67,94,135) of the clutch so as to be slidable along an axis parallel to the axis of rotation of the clutch, the intermediate pressure plate being positioned adjacent to a clutch disc and being operative so as to be selectively frictionally engageable therewith;
 first and second abutments provided adjacent to the pin, the first abutment providing a stop for determining adjustment of the pin relative to the intermediate pressure plate and the second abutment providing a stop for determining a disengaged position of the intermediate pressure plate;
 a plate (11,43,73,120,144) mounted on the pin by way of an aperture provided in the plate, which aperture is dimensioned such that the plate is tiltable relative to the pin;
 a third abutment provided on the intermediate pressure plate and engageable with the tiltable plate, the third abutment defining an axis about which the plate is tiltable; and
 a resilient member (17,47,81,122,150,160) urging the tiltable plate in the axial direction of the clutch towards the third abutment so as to cause the plate to tilt and to engage the pin, permitting adjustment of the pin relative to the intermediate pressure plate when the pin is urged against the first abutment and inhibiting movement of the pin relative to the intermediate pressure plate when the pin is urged against the second abutment.

2. An adjusting device as claimed in claim 1, wherein the first abutment is provided on a main pressure plate (93,133) of the clutch and engageable by a circlip (119,143) located in a circumferential groove formed in the pin and extending outwardly from said groove.

3. An adjusting device as claimed in claim 1, wherein the first abutment is provided on a face (68) of a driving member of the clutch and is engageable by an end of the pin.

4. An adjusting device as claimed in claim 1, 2 or 3, wherein the second abutment is provided on a main pressure plate (133) of the clutch and engageable by an enlarged head portion (40,117) provided at an end of the pin or by a circlip (141) mounted on the pin.

5. An adjusting device as claimed in claim 1, wherein the second abutment (41,70) is provided on a spacing ring arranged between a driving member of a clutch and a clutch cover and is engageable by an end of the pin.

6. An adjusting device as claimed in claim 1, wherein the resilient member comprises a coil spring (17,47,122) which is arranged around the pin.

7. An adjusting device as claimed in claim 1, wherein the resilient member comprises a coil spring (81,150) located on that side of the pin remote from the third abutment.

8. An adjusting device as claimed in claim 7, wherein the coil spring is held in place by a pin or rivet (148) extending axially within the spring.

9. An adjusting device as claimed in claim 1 and including a further resilient member (21,51,71) to urge the pin towards the first abutment.

10. An adjusting device as claimed in claim 1 and including frictional damping means (49) positioned around the pin so as to increase the frictional force between the pin and the intermediate pressure plate.

11. An adjusting device as claimed in claim 1, wherein the resilient member comprises a leaf spring (160).

12. An adjusting device as claimed in claim 1, wherein the pin is provided with radially opposed substantially flat surfaces (69a,69b) which engage with corresponding substantially straight edges defining a part of the aperture in the plate.

13. An adjusting device as claimed in claim 12, wherein the flat surfaces provided on the pin are formed with serrations.

* * * * *

UNITED STATES PATENT AND TRADEMARK OFFICE
CERTIFICATE OF CORRECTION

PATENT NO.  : 4,958,714

DATED       : September 25, 1990

INVENTOR(S) : Richard David COOKE & Charles Higgin BOTTOM

It is certified that error appears in the above-identified patent and that said Letters Patent is hereby corrected as shown below:

Column 9, claim 4, line 1 delete "2 or 3".

Signed and Sealed this

Nineteenth Day of May, 1992

Attest:

DOUGLAS B. COMER

Attesting Officer

Acting Commissioner of Patents and Trademarks